(12) United States Patent
Doshi et al.

(10) Patent No.: US 9,026,873 B2
(45) Date of Patent: May 5, 2015

(54) METHOD AND APPARATUS FOR SECURING CONFIGURATION SCAN CHAINS OF A PROGRAMMABLE DEVICE

(71) Applicant: Altera Corporation, San Jose, CA (US)

(72) Inventors: Alok Shreekant Doshi, San Jose, CA (US); Bruce B. Pedersen, Sunnyvale, CA (US)

(73) Assignee: Altera Coporation, San Jose, CA (US)

( * ) Notice: Subject to any disclaimer, the term of this patent is extended or adjusted under 35 U.S.C. 154(b) by 20 days.

(21) Appl. No.: 13/948,433

(22) Filed: Jul. 23, 2013

(65) Prior Publication Data

US 2015/0033360 A1    Jan. 29, 2015

(51) Int. Cl.
  *G01R 31/28* (2006.01)
  *G06F 21/76* (2013.01)
  *G06F 21/44* (2013.01)
  *G01R 31/3185* (2006.01)

(52) U.S. Cl.
  CPC ............... *G06F 21/76* (2013.01); *G06F 21/44* (2013.01); *G01R 31/318519* (2013.01)

(58) Field of Classification Search
  CPC ......... G06F 21/44; G06F 21/76; G06F 21/62; G01R 31/318519
  USPC ........................................................ 714/726
  See application file for complete search history.

(56) References Cited

U.S. PATENT DOCUMENTS

| | | |
|---|---|---|
| 4,609,986 A | 9/1986 | Hartmann et al. |
| 4,617,479 A | 10/1986 | Hartmann et al. |
| 4,677,318 A | 6/1987 | Veenstra |
| 4,713,792 A | 12/1987 | Hartmann et al. |
| 4,774,421 A | 9/1988 | Hartmann et al. |
| 4,871,930 A | 10/1989 | Wong et al. |
| 4,899,067 A | 2/1990 | So et al. |
| 4,912,342 A | 3/1990 | Wong et al. |
| 5,033,084 A | 7/1991 | Beecher |
| 5,081,675 A | 1/1992 | Kittirutsunetorn |
| 5,121,006 A | 6/1992 | Pedersen |

(Continued)

OTHER PUBLICATIONS

Badrignans, B.; Elbaz, R.; Torres, L., "Secure update Mechanism for Remote Update of FPGA-Based System," Industrial Embedded Systems, 2008. SIES 2008. International Symposium on, vol., no., pp. 221,224, Jun. 11-13, 2008.*

Thanh, Tran; Tiep, Vu Huu; Vu, Tran Hoang; Nam, Pham Ngoc; Van Cuong, Nguyen, "Secure remote updating of bitstream in partial reconfigurable embedded systems based on FPGA," Computing, Management and Telecommunications (ComManTel), 2013 International Conference on, vol., no., pp. 152,156, Jan. 21-24, 2013.*

(Continued)

*Primary Examiner* — Cynthia Britt
(74) *Attorney, Agent, or Firm* — Ropes & Gray LLP; Jeffrey H. Ingerman (57) ABSTRACT

Scan chain circuitry on an integrated circuit device includes a plurality of memory elements, and a plurality of control elements. Each of the control elements is located between respective ones of the plurality of memory elements for controllably connecting the plurality of memory elements into a scan chain. A plurality of respective scan enable activation elements controls a respective subplurality of the plurality of control elements for connecting a respective subplurality of the plurality of memory elements into the scan chain. Each scan enable activation element is actuated, to connect its respective subplurality of the plurality of memory elements into the scan chain, by a first enable signal common to more than one of the scan enable activation elements, and a second enable signal for that one of the scan enable activation elements. Such scan chain circuitry may be used for entering configuration data into a programmable integrated circuit device.

20 Claims, 7 Drawing Sheets

(56) References Cited

U.S. PATENT DOCUMENTS

| | | | |
|---|---|---|---|
| 5,220,214 | A | 6/1993 | Pedersen |
| 5,260,610 | A | 11/1993 | Pedersen et al. |
| 5,260,611 | A | 11/1993 | Cliff et al. |
| 5,350,954 | A | 9/1994 | Patel |
| 5,371,422 | A | 12/1994 | Patel et al. |
| 5,388,157 | A | 2/1995 | Austin |
| 5,450,022 | A | 9/1995 | New |
| 5,479,512 | A | 12/1995 | Weiss |
| 5,513,262 | A | 4/1996 | Van Rumpt et al. |
| 5,548,228 | A | 8/1996 | Madurawe |
| 5,563,592 | A | 10/1996 | Cliff et al. |
| 5,581,198 | A | 12/1996 | Trimberger |
| 5,636,281 | A | 6/1997 | Antonini |
| 5,768,372 | A | 6/1998 | Sung et al. |
| 5,915,017 | A | 6/1999 | Sung et al. |
| 6,172,520 | B1 | 1/2001 | Lawman et al. |
| 6,931,543 | B1 | 8/2005 | Pang et al. |
| 6,965,675 | B1* | 11/2005 | Trimberger et al. ......... 380/277 |
| 7,058,177 | B1 | 6/2006 | Trimberger et al. |
| 7,162,644 | B1 | 1/2007 | Trimberger |
| 7,299,390 | B1* | 11/2007 | Dastidar ...................... 714/726 |
| 7,512,852 | B2* | 3/2009 | Bancel et al. ................. 714/726 |
| 7,536,559 | B1* | 5/2009 | Jenkins et al. ............... 713/189 |
| 7,550,324 | B1 | 6/2009 | Walstrum et al. |
| 7,675,313 | B1 | 3/2010 | Tang et al. |
| 7,683,663 | B1 | 3/2010 | Tsai |
| 8,438,436 | B1* | 5/2013 | Baker et al. .................. 714/726 |
| 8,505,078 | B2* | 8/2013 | Hohlfeld et al. .................. 726/5 |
| 2001/0015919 | A1 | 8/2001 | Kean |
| 2001/0032318 | A1* | 10/2001 | Yip et al. ..................... 713/190 |
| 2006/0209584 | A1 | 9/2006 | Devadas et al. |
| 2007/0022341 | A1 | 1/2007 | Morgan et al. |
| 2007/0074045 | A1 | 3/2007 | Van Essen et al. |
| 2011/0314514 | A1* | 12/2011 | Goyal et al. ..................... 726/2 |

OTHER PUBLICATIONS

Tiwari, A., "A novel zero overhead obfuscation technique for securing FPGA designs," Advances in Computing, Communications and Informatics (ICACCI), 2013 International Conference on, vol., no., pp. 554,558, Aug. 22-25, 2013.*

Atobe, Y.; Youhua Shi; Yanagisawa, M.; Togawa, N., "Secure Scan Design with Dynamically Configurable Connection," Dependable Computing (PRDC), 2013 IEEE 19th Pacific Rim International Symposium on, vol., no., pp. 256,262, Dec. 2-4, 2013.*

Atobe, Y.; Youhua Shi; Yanagisawa, M.; Togawa, N., "Dynamically changeable secure scan architecture against scan-based side channel attack," SoC Design Conference (ISOCC), 2012 International, vol., no., pp. 155,158, Nov. 4-7, 2012.*

Fujiwara, H.; Fujiwara, K.; Tamamoto, H., "Secure scan design using shift register equivalents against differential behavior attack," Design Automation Conference (ASP-DAC), 2011 16th Asia and South Pacific, vol., no., pp. 818,823, Jan. 25-28, 2011.*

Hely, D.; Bancel, F.; Flottes, M.-L.; Rouzeyre, B., "A secure Scan Design Methodology," Design, Automation and Test in Europe, 2006. Date '06. Proceedings, vol. 1, no., pp. 1,2, Mar. 6-10, 2006.*

Minnick, R.C., "A Survey of Microcellular Research," *Journal of the Association for Computing Machinery*, vol. 14, No. 2, pp. 203-241 (Apr. 1967).

Mukhopadhyay, A., *Recent Developments in Switching Theory*, Academic Press, New York, Chapters VI and IX, pp. 229-54 and 369-422 (1971).

Wahlstrom, S.E., "Programmable Logic Arrays—Cheaper by the Millions," *Electronics* pp. 90-95 (Dec. 11, 1967).

Hely, D., et al., "Secure Scan Techniques: a Comparison", *Proceedings of the 12th IEEE International On-Line Testing Symposium (IOLTS'06), IEEE*, pp. 119-24, Jul. 10-12, 2006.

* cited by examiner

METHOD AND APPARATUS FOR SECURING CONFIGURATION SCAN CHAINS OF A PROGRAMMABLE DEVICE

BACKGROUND OF THE INVENTION

This invention relates to a method and an apparatus for securing the programming data of a programmable device—e.g., a field-programmable gate array (FPGA) or other programmable logic device (PLD)—against copying, and to a programmable device so secured.

Programmable devices are well known. In one class of known PLDs, each device has a large number of logic gates, and a user programs the device to assume a particular configuration of those logic gates, frequently using a software tool provided by the manufacturer of the device, with the software tool being executed on a computer having an adapter into which the device is inserted. Early generations of such devices typically used some form of programmable read-only memory ("PROM") technology to store the configuration data produced by the software tool. In those early devices, the software tool caused the computer to "burn" the pattern into the PROM storage by fusing fusible links. In later generations, the PROM technology may have been erasable programmable read-only memory ("EPROM") technology, which was not burned, and could be erased (for reprogramming) by exposure to ultraviolet light. Still later generations may have used electrically erasable programmable read-only memory ("EEPROM" or "E²PROM") technology.

All of those technologies were relatively secure. In the case of a user who chose to use a programmable logic device rather than incur the effort and expense of a developing a custom chip, if a competitor of that user were to try to reverse engineer the programmed programmable logic device, the competitor would essentially have to slice the device layer by layer to discern its programming. While such an effort might be technically feasible, for the types of users being discussed, who by definition are not chip manufacturers, the likelihood that a competitor could or would undertake the effort was small.

Later, programmable logic devices that store their configuration data in static random access memory ("SRAM") storage became available and remain prevalent. Such devices have the advantage of being smaller and faster than the devices based on EPROM technology.

However, SRAM storage is volatile; it does not retain its contents when power is lost or removed. Therefore, programmable logic devices based on SRAM technology are used with nonvolatile storage, to retain the configuration programming data during times that the device is switched off or otherwise not provided with power. Such nonvolatile storage may be provided, for example, in the form of Flash memory, although any form of nonvolatile storage may be used, and it may be either on, or separate from, the device.

Whatever type of nonvolatile storage is used, an SRAM programmable logic device having nonvolatile storage of its configuration data is less secure against reverse engineering by a competitor of its user. That is because a competitor can monitor the data flowing out of the nonvolatile storage on power-up, and thereby determine the programming configuration of the programmable logic device. Indeed, the competitor need not even analyze the data stream, but need only record it and store it in its own devices.

Commonly-assigned U.S. Pat. Nos. 5,768,372 and 5,915,017, each of which is hereby incorporated by reference herein in its respective entirety, describe the encryption of the configuration data stored in the nonvolatile storage and its decryption upon loading into the programmable device, including provision of an indicator to signal to the decryption circuit which of several possible encryption/decryption schemes was used to encrypt the configuration data and therefore should be used to decrypt the configuration data.

However, even if the nonvolatile configuration data are secured against being read during device configuration, another avenue of unauthorized access to the configuration data may remain. Specifically, the configuration registers, which hold the configuration bits in a programmed device, are typically connected in a scan chain, which can be activated for testing purposes. If an unauthorized person could activate the scan chain after a device has been programmed, that person could read out the configuration data via the scan chain.

SUMMARY OF THE INVENTION

The present invention relates to circuitry and methods for protecting the configuration scan chain of a programmable device against unauthorized access by requiring separate local activation signals at multiple different locations along the scan chain.

Therefore, in accordance with embodiments of the present invention, there is provided scan chain circuitry on an integrated circuit device. The scan chain circuitry includes a plurality of memory elements on the integrated circuit device, and a plurality of control elements on the integrated circuit device. Each of the control elements is located between respective ones of the plurality of memory elements for controllably connecting the plurality of memory elements into a scan chain. There is a plurality of scan enable activation elements on the integrated circuit device. Each of the scan enable activation elements controls a respective subplurality of the plurality of control elements for connecting a respective subplurality of the plurality of memory elements into the scan chain. Each of the scan enable activation elements is actuated, to connect its respective subplurality of the plurality of memory elements into the scan chain, by a first enable signal common to more than one of the scan enable activation elements, and a second enable signal for that one of the scan enable activation elements.

A programmable integrated circuit device incorporating such scan chain circuitry, and a method of entering configuration data into such a programmable integrated circuit device, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Scan chains typically are provided throughout a programmable logic device for testing purposes. After the device is manufactured, a predetermined pattern of ones and zeroes is clocked through the scan chains and the progression of that pattern through the chain, which has registers throughout all parts of the device, is checked. If there is any deviation from the input pattern, that indicates a potential manufacturing flaw, which can be isolated by determining where in the chain the pattern becomes corrupted.

Although such scan chains can be arranged randomly throughout the device because they are intended to help locate regions of the device in which process defects may have occurred, it is not uncommon for the configuration registers to be arranged in their own scan chain or chains. During testing, as with any scan chain, a pattern of ones and zeroes is clocked through the chain of configuration registers and the progression of that pattern through that chain, or upon exit from the end of the chain, is examined. Assuming that the configuration registers pass the scan chain test, they are loaded with respective user configuration bits and the scan chain mode is normally not activated again.

However, an unauthorized person intent on copying the configuration bits from the device may be able to activate the scan chain. For example, a focused ion beam, or any other suitable probe, may be able to apply a signal to the scan chain activation enable conductor of a programmed or configured device, which could allow that person to read out the entire configuration bitstream. That person would not even have to analyze or understand the bitstream, but could simply record it and load it into blank programmable devices.

According to implementations of the invention, protection against such unauthorized access to the configuration bitstream can be provided by requiring application of independent authorization signals to separate scan enable elements at multiple locations along the configuration scan chain. While the configuration scan chain could still be activated by a person who is able to apply a signal simultaneously to all of those locations, the likelihood of such a person being able to simultaneously apply all of those signals is small.

Because the individual registers in the configuration scan chain, when in scan chain mode, are, by definition, chained together, failure of an unauthorized person to successfully activate at least one particular register in the chain would prevent that person from reading any configuration bits from upstream of that particular register. Thus, if the unauthorized person is unsuccessful in activating even one scan enable element, not only would the unauthorized person not have access to the contents of any register or registers controlled by that scan enable element, but the unauthorized person also would not have access to the contents of any register upstream of the register or registers controlled by that scan enable element.

Nevertheless, for an additional layer of security, the various scan enable elements could be linked together so that not only would each scan enable element expect its own activation signal, but it also would expect that all of the upstream scan enable elements were successfully activated. Thus, if any one scan enable element is not activated, then no scan enable element downstream of that one scan enable element would be activated. Therefore, the unauthorized person would not be able to read out even the partial bitstream controlled by those scan enable elements downstream of the furthest downstream scan enable element whose individual activation signal is not applied. In a further enhancement, each scan enable element (except for the element that is furthest downstream) also would expect that all of the downstream scan enable elements were successfully activated. When such an enhancement is applied, the unauthorized person would not be able to read out even a partial bitstream as long as there is even one scan enable element whose individual activation signal is not applied.

The invention will now be described with reference to FIGS. 1-6.

Figure 1:
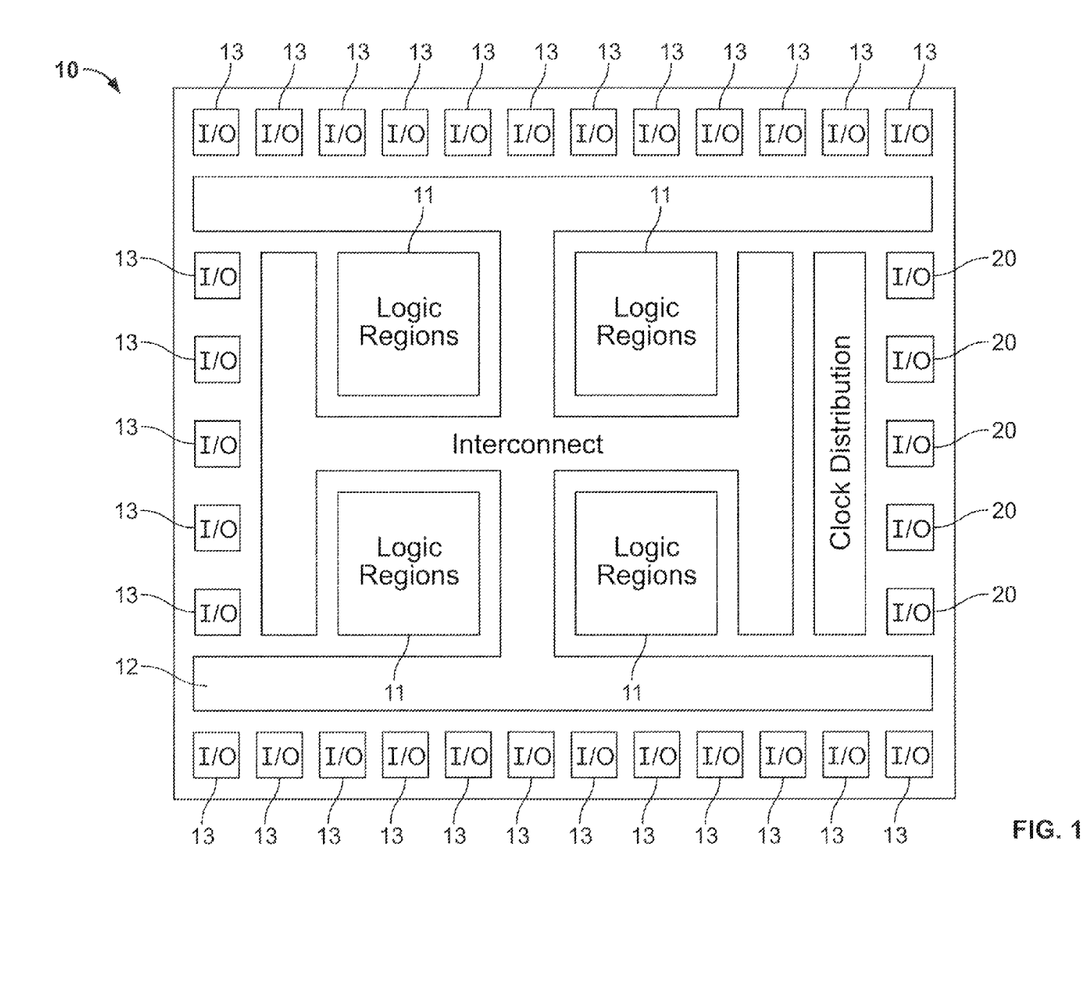
FIG. 1 is a block diagram of a programmable device in which the present invention may be implemented.

PLD 10, shown schematically in FIG. 1, is one example of a device with which the present invention can be used. PLD 10 has a programmable logic core including programmable logic regions 11 accessible to programmable interconnect structure 12, which also is accessible to a plurality of input/output ("I/O") regions 13. The layout of regions 11 and interconnect structure 12 as shown in FIG. 1 is intended to be schematic only, as many actual arrangements are known to, or may be created by, those of ordinary skill in the art.

Programmable logic regions 11, programmable interconnect structure 12, and I/O regions 13 preferably are configurable or programmable, allowing PLD 10 to serve as whatever form of logic circuitry a user may require. The configuration of the PLD 10 may be achieved by setting the values of individual configuration bits scattered throughout PLD 10. The configuration bits, for example, may control certain switches, thereby establishing whether or not particular connections are made, or may cause multiplexers or other function control elements to select from among various inputs or outputs, or may otherwise determine the functionality of PLD 10 in ways that are well known.

The configuration bits may be stored in configuration registers scattered throughout PLD 10. Normally, the register for a configuration bit controlling a particular element can be expected to be located relatively close the element controlled by that configuration bit, but that it not necessarily so, nor is the location of each configuration register relative to the element that it controls important to the present invention.

As stated above, the various configuration registers in PLD 10 are connected together in one or more scan chains. The greater the number of configuration registers in PLD 10, the more likely it would be that they would not be connected in a single scan chain. For example, it would be easier to isolate a defect if the registers were connected in several different scan chains, each covering only a portion of PLD 10.

The scan chain or chains normally would only be used for testing PLD 10, as described above. However, if the configuration registers are included in their own scan chain or chains—i.e., there are no other registers of PLD 10 included in the same scan chain or chains as the configuration registers—then the configuration register scan chains also can be used to program PLD 10, clocking the configuration bits into the configuration registers through the scan chains (although the configuration bits also might be loaded by individually addressing the configuration registers). Either way, the scan chains ordinarily would not be used during normal run-time operations.

Figure 2:
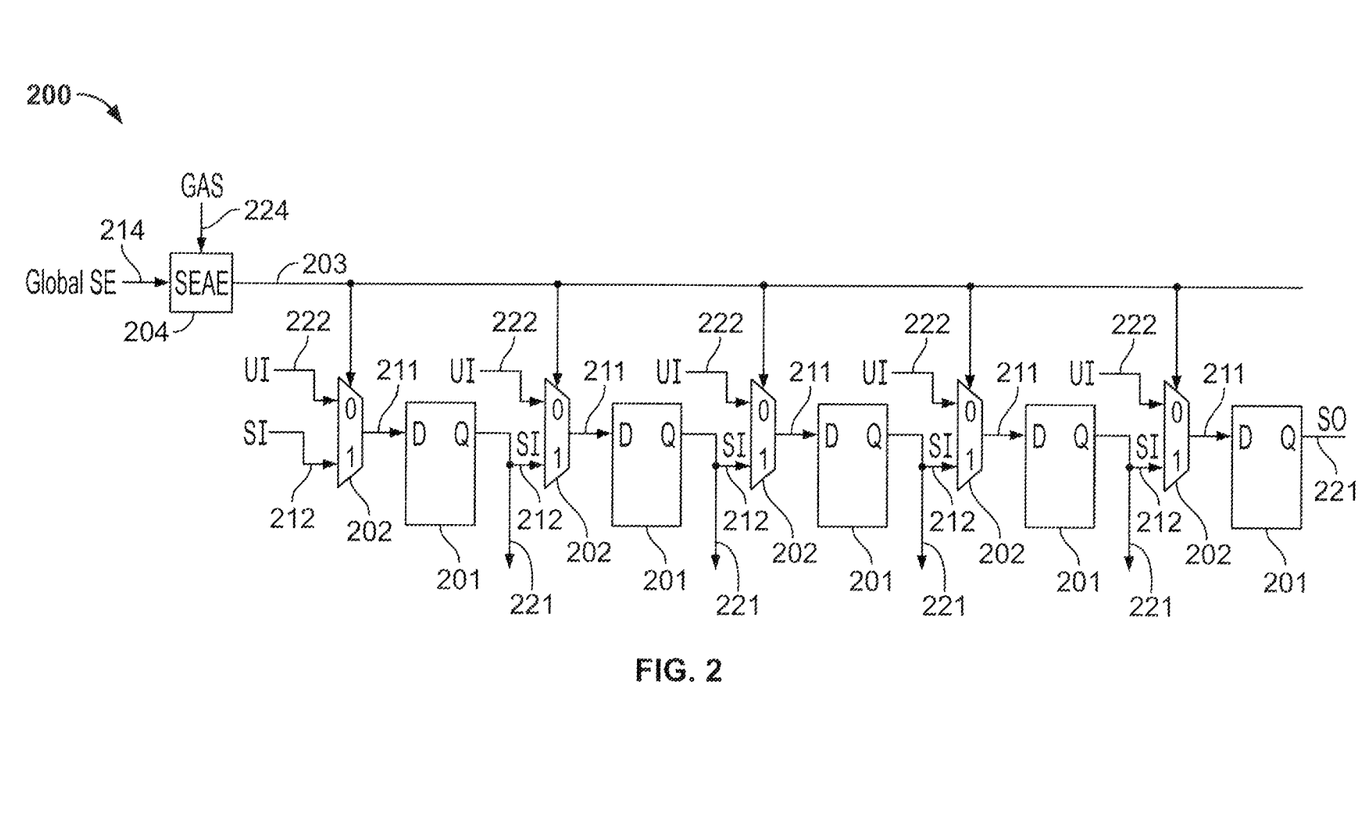
FIG. 2 is a block diagram of representative portion of one implementation of a configuration register scan chain.

FIG. 2 shows a representative portion of one implementation of a configuration register scan chain 200 without the benefit of the present invention. Scan chain 200 is made up of a plurality of configuration registers 201, each which, as shown, may be implemented as a flip-flop (although other memory technologies may be used). A respective multiplexer (or other control element) 202 on the input 211 of each register 201 selects either scan input 212 which is connected to the output 221 (when not in scan chain mode, output 221 connects to the circuit element controlled by that particular configuration bit) of the previous register 201, or user input 222. Scan enable signal 203 controls whether multiplexer 202 selects scan input 212 to operate in scan chain mode, or user input 222 to operate in user mode.

In user mode, user input 222 could be used to program or configure PLD 10 by individually addressing registers 201 rather than clocking in the configuration data serially, or to allow reconfiguration on-the-fly based on inputs either from a user or from logic elsewhere on PLD 10 (it being noted that "user input" denotes either data actually input from an input/output pin by a user, or data from user logic elsewhere on PLD 10). In scan chain mode, PLD 10 could be programmed by clocking configuration bits into input 212 serially as noted above, or scan chain mode can be used for testing as described.

Either way, once PLD 10 has been programmed or configured, scan chain mode would not normally be expected to be used. Scan enable signal 203 is asserted by scan enable activation element 204 under the control of two inputs. The first input is a user scan enable signal 214, and the second input is a scan activation signal 224 which is asserted only when certain "security" criteria are met. Those criteria could include user input of an authorization code or key, or fuse element, or other authorization signal, but more frequently is simply the absence of configuration data from configuration registers 201 (as determined, e.g., by ORing together all of the configuration registers 201 in the scan chain in question; not shown). Thus, once PLD 10 has been programmed, the security criteria would not be met, and scan chain 200 could not be activated, thereby preventing unauthorized read-out of the configuration data stream via scan chain 200.

However, an unauthorized person might still succeed in reading out the configuration data stream via scan chain 200, if that person could activate scan enable signal 203 notwithstanding the absence of the security criteria. One way in which that could be accomplished might be by using a focused-ion-beam probe, but any technique that could isolate and assert signal 203 (e.g., a microscopic mechanical probe) could allow unauthorized access. Even if all of configuration registers 201 were not connected in a single scan chain 200, the number of scan chains 200 is likely to be relatively small, meaning that the unauthorized person still would need to probe only a relatively small number of locations to be able to read the entire configuration bitstream.

In accordance with implementations and embodiments of the present invention, security of the configuration bitstream may be enhanced by greatly increasing the number of locations that an unauthorized person would have to probe to be able to read the entire configuration bitstream, or even to read the entire bitstream portion included in a single scan chain (where the configuration is spread over multiple scan chains).

Figure 3:
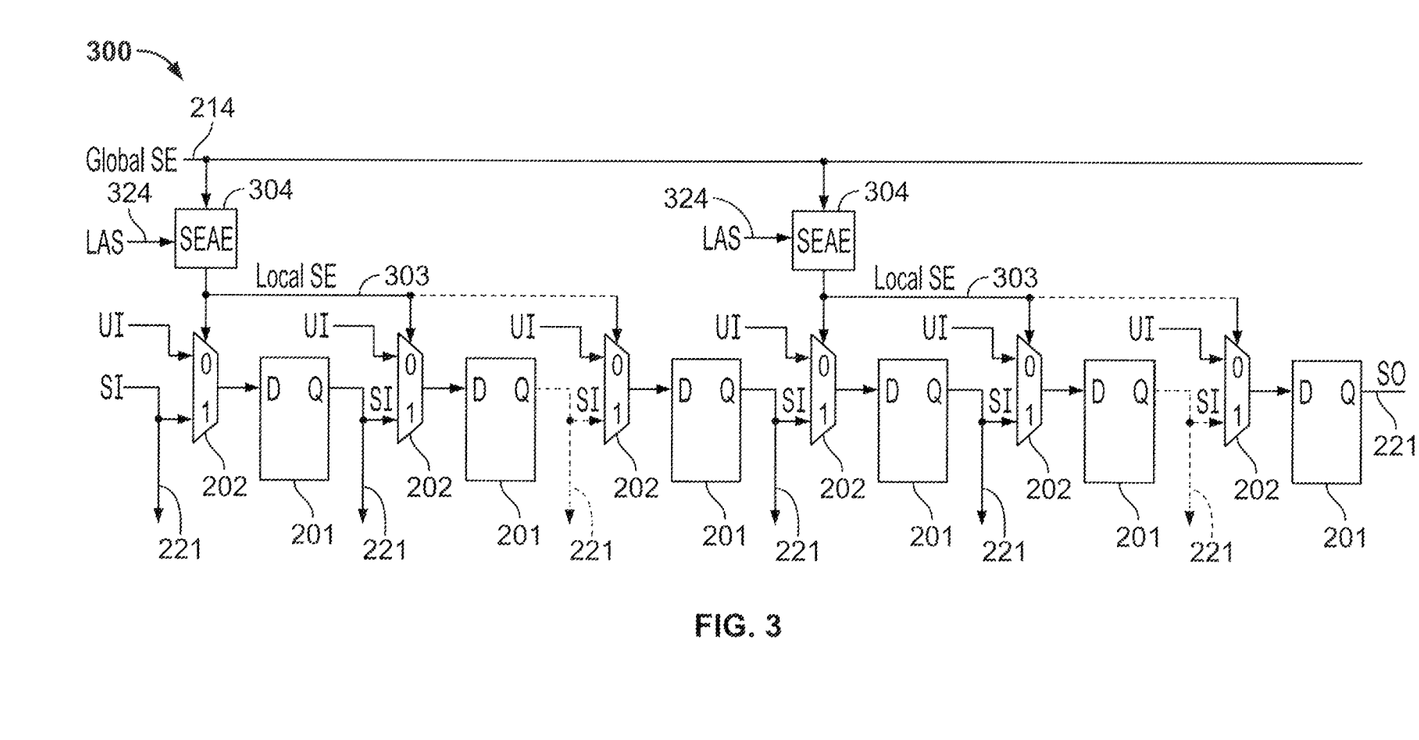
FIG. 3 is a block diagram of representative portion of one implementation of a configuration register scan chain incorporating an embodiment of the present invention.

A representative portion of an implementation of a scan chain 300 according to embodiments of the invention is shown in FIG. 3. Scan chain 300 may include the same (or similar) configuration registers 201 and multiplexers (or other control elements) 202 as scan chain 200. However, instead of a single global scan enable activation element 204 activated by a single scan enable signal 214 and a single scan activation signal 224, scan chain 300 may have a plurality of local scan enable activation elements 304 activated by a single scan enable signal 214 and respective individual local scan activation signals 324, to provide respective local scan enable signals 303. Local scan activation signals 324 may be similar to scan activation signal 224 in that each may be activated either by the correct user input, or by a predetermined security condition or set of conditions.

It is apparent that an unauthorized person would not be able to read the entire contents of scan chain 300 by successfully probing only a single point in scan chain 300. Instead, the unauthorized person would have to successfully activate all local scan activation signals 324 simultaneously. Generally, it is difficult to probe even two locations simultaneously, and the difficulty increases more or less exponentially as the number of locations that would have to be probed increases. Thus, the more local scan enable activation elements 304 included in scan chain 300, the more secure scan chain 300 becomes, and at some point between $2^5$ elements and $2^6$ elements, the probability of a successful attack likely would approach zero.

Figure 4:
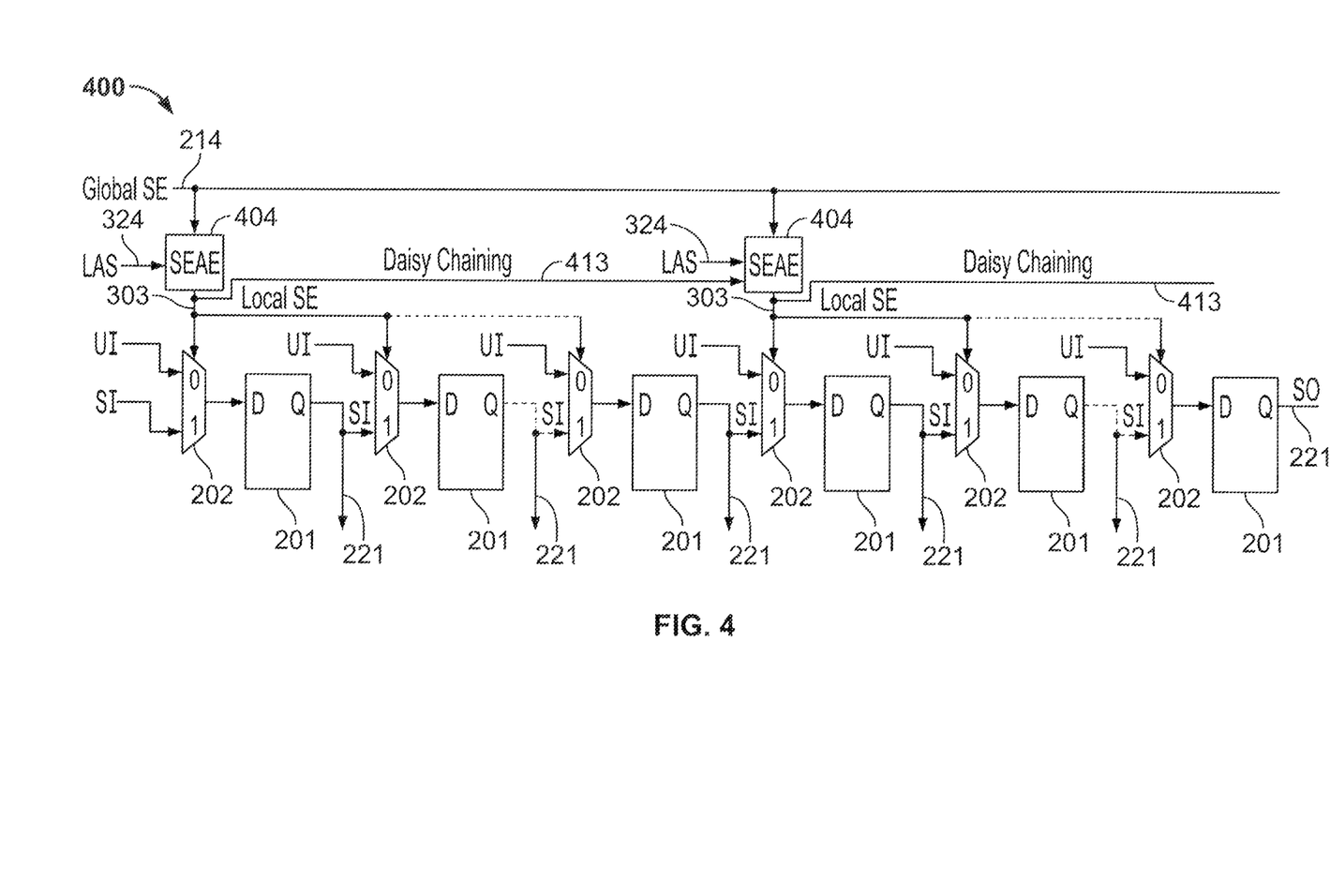
FIG. 4 is a block diagram of representative portion of another implementation of a configuration register scan chain incorporating an embodiment of the present invention.

As noted above, security of a scan chain 400 can be increased further, as shown in FIG. 4, by linking local scan enable activation elements 404 so that, except for the first local scan enable activation element 404 in scan chain 400, a local scan enable activation element 404 cannot be activated unless it receives not only local scan activation signal 324, but also local scan enable signal 303 output by the previous local scan enable activation element 404 (via forward daisy chain links 413). The particular logic in a local scan enable activation element 404 to check for the assertion of both local scan activation signal 324 and the previous local scan enable signal 303 is not shown. Any logic that requires the assertion of both signals 303 and 324 could be used. For example, something as simple as an AND gate, where the two inputs to the gate were local scan activation signal 324 and the previous local scan enable signal 303, could be used.

In the implementation of FIG. 3, if an unauthorized person were successful in activating only some of the local scan enable activation elements 304, then the unauthorized person would be able to read out the portion of scan chain 300 downstream of the furthest downstream local scan enable activation element 304 that was not activated (unless the furthest downstream local scan enable activation element 304 that was not activated was the last local scan enable activation element in the chain). But in the implementation of FIG. 4, because the enable signals also are chained, if the unauthorized person is unsuccessful in probing any of local scan enable activation elements 404, then even if that person is successful in probing all other local scan enable activation elements 404, none of the local scan enable activation elements 404 downstream of the local scan enable activation element 404 that was not successfully probed would be activated. Therefore, the unauthorized person would not be able to read any portion of the scan chain (unless the unauthorized person was able to tap into the scan chain at a point upstream of the unsuccessfully probed local scan enable activation element 404).

Figure 5:
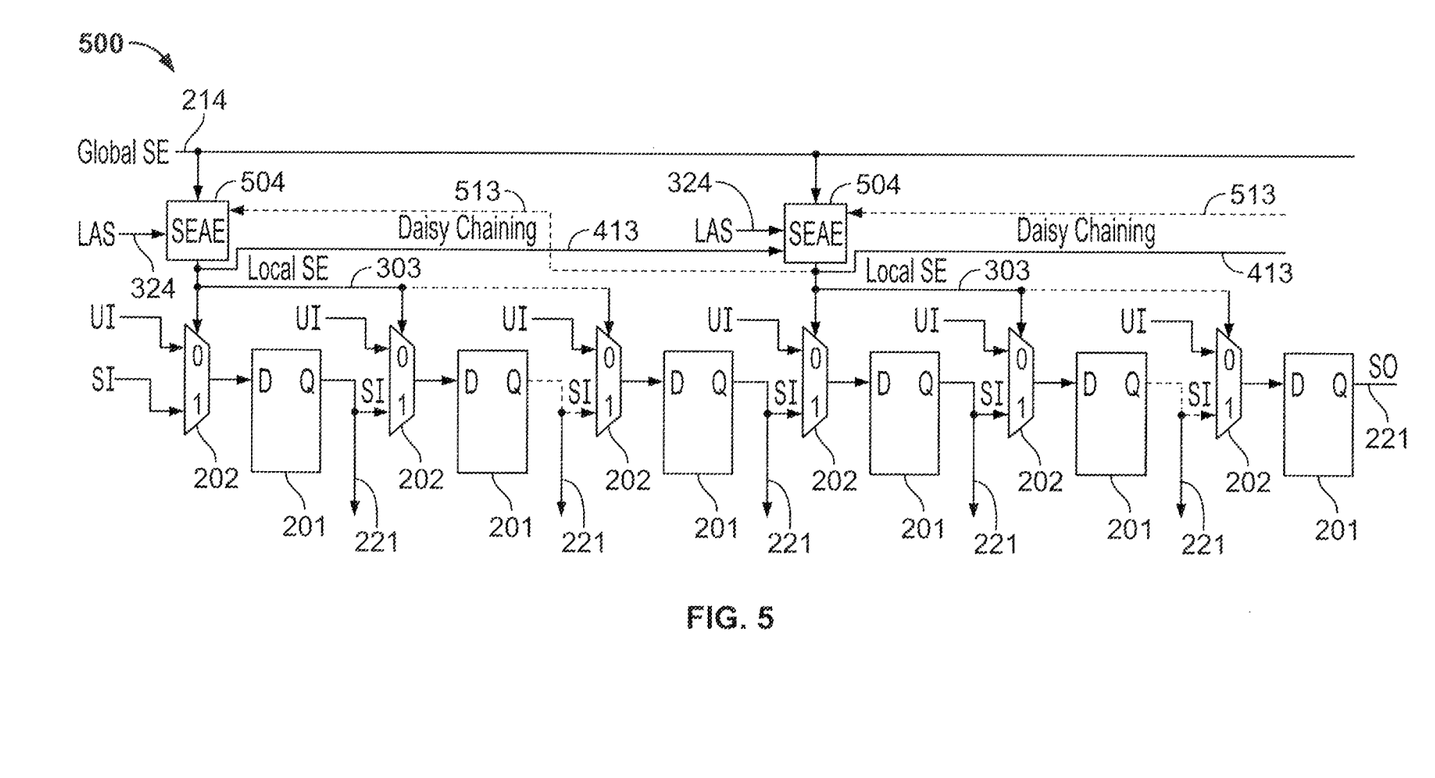
FIG. 5 is a block diagram of representative portion of yet another implementation of a configuration register scan chain incorporating an embodiment of the present invention.

In the further enhancement discussed above, security of a scan chain 500 can be increased still further, as shown in FIG. 5, by linking local scan enable activation elements 504 in both directions. Like local scan enable activation elements 404, each local scan enable activation element 504, except for the first local scan enable activation element 504 in scan chain 500, cannot be activated unless it receives not only local scan activation signal 324, but also local scan enable signal 303 output by the previous local scan enable activation element 504. In addition, unlike local scan enable activation elements 404, each local scan enable activation element 504, except for the last local scan enable activation element 504 in scan chain 500, cannot be activated unless it receives not only local scan activation signal 324, and local scan enable signal 303 output by the previous local scan enable activation element 504, but also local scan enable signal 303 output by the following local scan enable activation element 504 (via reverse daisy chain links 513). Again, the particular logic in a local scan enable activation element 504 to check for the assertion of both local scan activation signal 324 and the previous and following local scan enable signal 303 is not shown. Any logic that requires the assertion of signal 324 as well both the previous and following signals 303, could be used. For example, something as simple as a three-input AND gate, where the three inputs to the gate were local scan activation signal 324 and the previous and following local scan enable signals 303, could be used.

Unlike the case of the implementation of FIG. 4, in the implementation of FIG. 5, because the enable signals also are chained in both directions, if the unauthorized person is unsuccessful in probing even one of local scan enable activation elements 504, then none of the other local scan enable activation elements 504, whether upstream or downstream, would be activated. Therefore, the unauthorized person would not be able to read any portion of the scan chain (regardless of where the unauthorized person is able to tap into the scan chain).

Scan chains according to implementations of the present invention can be used, as noted above, for testing device 10, or for programming device 10. Either way, if the security conditions as described above are met, and a scan chain enable signal is applied, scan enable activation elements 304/404/504 would cause multiplexers or other control elements 202 to connect configuration memory elements 201 into a scan chain. Test data could then be clocked through the scan chain, to see if the data that emerged from the scan chain is the same as (successful test) or different from (unsuccessful test) the data clocked in. For programming device 10, a configuration bitstream could be clocked in until the first bit clocked in reaches the last configuration memory element 201 in the scan chain.

If the security condition for scan activation signals 324 is the absence of data in the corresponding configuration registers 201, those signals would have to be latched at the beginning of the testing or programming process. Otherwise, as soon as data were clocked into the scan chain, the security conditions would fail, the states of signals 324 would change, and the scan chain would be deactivated.

Figure 6:
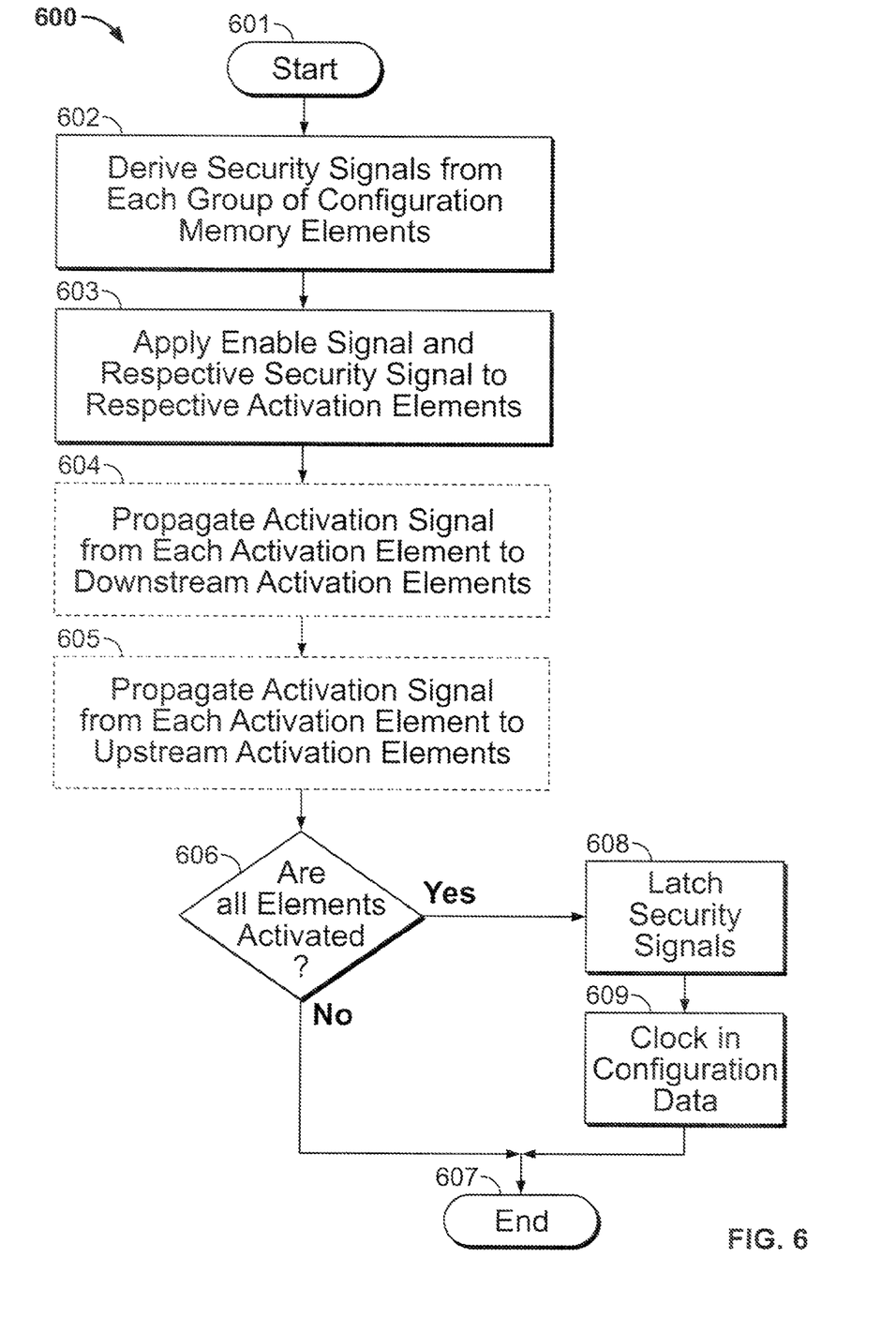
FIG. 6 is a flow diagram illustrating one example of a method of programming or configuring a programmable device in accordance with embodiments of the present invention.

An example of such a programming or configuration process 600 is diagrammed in FIG. 6 and starts at 601. At 602, security signals are derived from each group of configuration elements. As discussed above, the security signal could be a user-entered code or key, but more likely would be derived from the configuration elements themselves. Specifically, again, the values in the configuration elements in each group could be ORed together to confirm that they are empty.

At 603, an enable signal would be applied to the respective activation elements of all groups, along with the respective security signal to the respective activation element of each group. For each group so enabled, and for which the security signal is valid, an activation signal would be generated. At 604, which is optional (therefore drawn in phantom), the activation signal for each element is propagated to its respective downstream activation element, for the purpose discussed above. Similarly, at 605, which also is optional (therefore drawn in phantom), and probably would not be carried out if the actions at 604 are not carried out, the activation signal for each element is propagated to its respective upstream activation element, for the purpose discussed above.

At 606, it is determined whether all activation elements are activated (whether based only on their respective signals, or also on signals propagated from other activation elements). If not, then process 600 ends at 607. If at 606 it is determined that all activation elements are activated, then the respective security signals are latched at 608 (for reasons discussed above), and then the configuration bitstream may be clocked in at 609, after which process 600 ends at 607.

A PLD 90 programmed according to any embodiment of the present invention may be used in many kinds of electronic devices. One possible use is in a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 7:
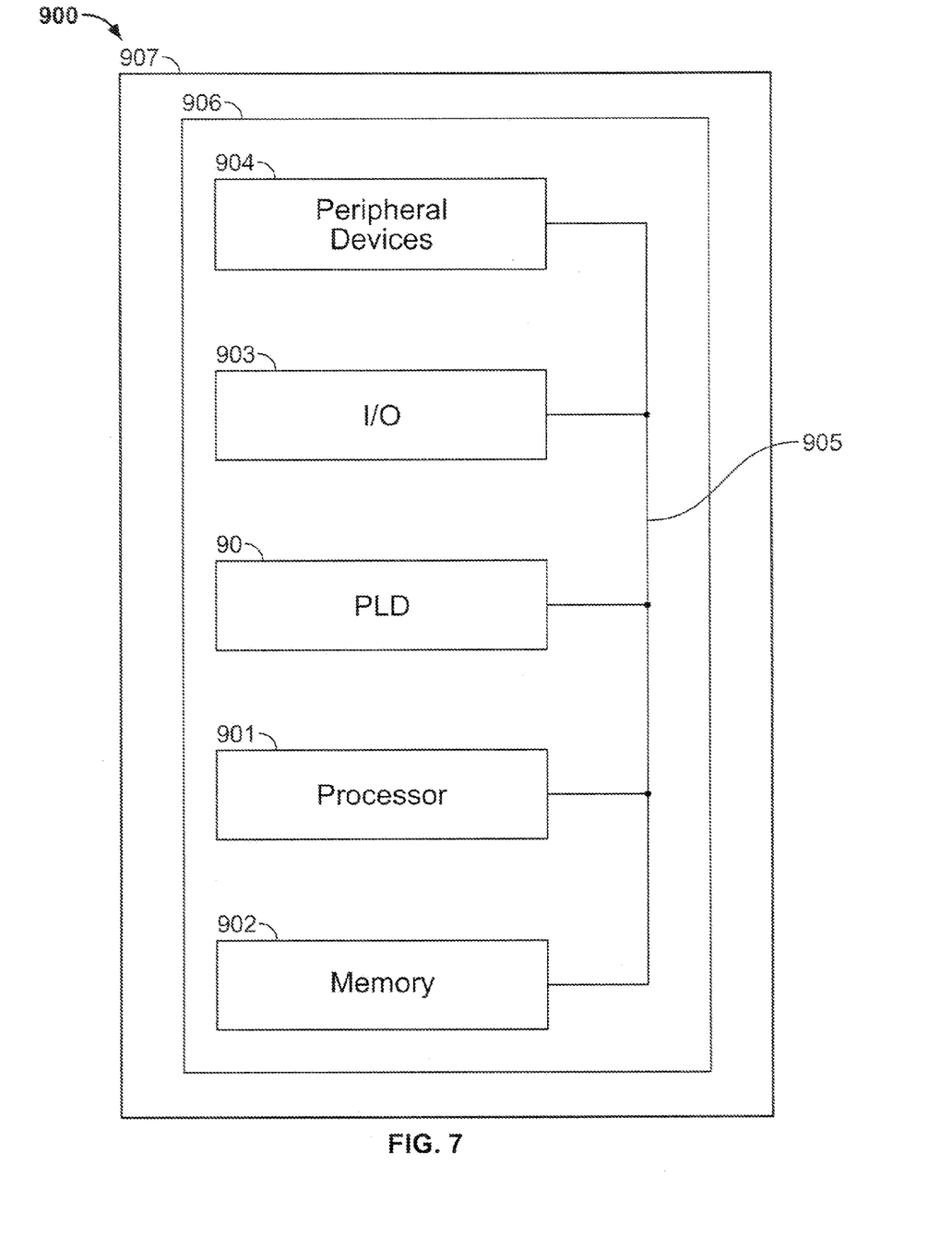
FIG. 7 is a simplified block diagram of an illustrative system employing a programmable logic device that may be programmed or configured according to the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A programmable integrated circuit device comprising:
a plurality of configuration memory elements for storing configuration data for said programmable integrated circuit device;
a plurality of control elements, each of said control elements being located between respective ones of said plurality of configuration memory elements for controllably connecting said plurality of configuration memory elements into a scan chain; and
a plurality of scan enable activation elements, each of said scan enable activation elements controlling a respective subplurality of said plurality of control elements for connecting a respective subplurality of said plurality of said configuration memory elements into said scan chain; wherein:
each of said scan enable activation elements is actuated, to connect its respective subplurality of said plurality of configuration memory elements into said scan chain, by a first enable signal common to more than one of said scan enable activation elements, and a second enable signal for said one of said scan enable activation elements.

2. The programmable integrated circuit device of claim 1 wherein said first enable signal is common to all of said scan enable activation elements.

3. The programmable integrated circuit device of claim 1 wherein said second enable signal is based on security information.

4. The programmable integrated circuit device of claim 3 wherein said security information is a user key input by a user.

5. The programmable integrated circuit device of claim 3 wherein said security information is based on a condition of said device.

6. The programmable integrated circuit device of claim 5 wherein said condition of said device is, as to a respective one of said scan enable activation elements, absence of any configuration data in said respective subplurality of said plurality of configuration memory elements corresponding to said respective one of said scan enable activation elements.

7. The programmable integrated circuit device of claim 1 wherein each of said control elements comprises a multiplexer that selects, as an input to one of said configuration memory elements, between a user input and an output of another one of said configuration memory elements.

8. The programmable integrated circuit device of claim 1 wherein at least one of said scan enable activation elements requires for actuation, to connect its respective subplurality of said plurality of configuration memory elements into said scan chain, a third enable signal output by another one of said scan enable activation elements.

9. The programmable integrated circuit device of claim 8 wherein each respective one of said scan enable activation elements, other than a first one of said scan enable activation elements, requires a respective instance of said third enable signal, each respective instance of said third enable signal being output by a respective other one of said scan enable activation elements.

10. The programmable integrated circuit device of claim 9 wherein:
said respective other one of said scan enable activation elements is immediately upstream of said respective one of said scan enable activation elements; and
each respective one of said scan enable activation elements, other than a last one of said scan enable activation elements, requires a respective instance of a fourth enable signal, each respective instance of said fourth enable signal being output by an immediately downstream other one of said scan enable activation elements.

11. Scan chain circuitry on an integrated circuit device, said scan chain circuitry comprising:
a plurality of memory elements on said integrated circuit device;
a plurality of control elements on said integrated circuit device, each of said control elements being located between respective ones of said plurality of memory elements for controllably connecting said plurality of memory elements into a scan chain; and
a plurality of scan enable activation elements on said integrated circuit device, each of said scan enable activation elements controlling a respective subplurality of said plurality of control elements for connecting a respective subplurality of said plurality of memory elements into said scan chain; wherein:
each of said scan enable activation elements is actuated, to connect its respective subplurality of said plurality of memory elements into said scan chain, by a first enable signal common to more than one of said scan enable activation elements, and a second enable signal for said one of said scan enable activation elements.

12. The scan chain circuitry of claim 11 wherein said first enable signal is common to all of said scan enable activation elements.

13. The scan chain circuitry of claim 11 wherein said second enable signal is based on security information.

14. The scan chain circuitry of claim 13 wherein said security information is a user key input by a user.

15. The scan chain circuitry of claim 13 wherein said security information is based on a condition of said device.

16. The scan chain circuitry of claim 15 wherein said condition of said device is, as to a respective one of said scan enable activation elements, absence of any data in said respective subplurality of said plurality of memory elements corresponding to said respective one of said scan enable activation elements.

17. The scan chain circuitry of claim 11 wherein each of said control elements comprises a multiplexer that selects, as an input to one of said memory elements, between a user input and an output of another one of said memory elements.

18. The scan chain circuitry of claim 11 wherein at least one of said scan enable activation elements requires for actuation, to connect its respective subplurality of said plurality of memory elements into said scan chain, a third enable signal output by another one of said scan enable activation elements.

19. The scan chain circuitry of claim 18 wherein each respective one of said scan enable activation elements, other than a first one of said scan enable activation elements, requires a respective instance of said third enable signal, each respective instance of said third enable signal being output by a respective other one of said scan enable activation elements.

20. The scan chain circuitry of claim 19 wherein:
said respective other one of said scan enable activation elements is immediately upstream of said respective one of said scan enable activation elements; and
each respective one of said scan enable activation elements, other than a last one of said scan enable activation elements, requires a respective instance of a fourth enable signal, each respective instance of said fourth enable signal being output by an immediately downstream other one of said scan enable activation elements.

* * * * *